US006169515B1

(12) United States Patent
Mannings et al.

(10) Patent No.: US 6,169,515 B1
(45) Date of Patent: *Jan. 2, 2001

(54) NAVIGATION INFORMATION SYSTEM

(75) Inventors: Robin Thomas Mannings; Nigel David Charles Wall, both of Ipswich (GB)

(73) Assignee: British Telecommunications public limited company, London (GB)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/793,502

(22) PCT Filed: Sep. 1, 1995

(86) PCT No.: PCT/GB95/02065

§ 371 Date: Mar. 20, 1997

§ 102(e) Date: Mar. 20, 1997

(87) PCT Pub. No.: WO96/07110

PCT Pub. Date: Mar. 7, 1996

(30) Foreign Application Priority Data

Sep. 1, 1994  (GB) .................................................. 9417600

(51) Int. Cl.⁷ .............................. H04B 7/185; G01S 5/02
(52) U.S. Cl. .................................. 342/357.1; 342/357.13; 342/457; 701/213; 701/217; 701/220; 701/209; 701/211
(58) Field of Search ..................................... 342/457, 357, 342/357.1, 357.13; 701/213, 217, 220, 209, 211

(56) References Cited

U.S. PATENT DOCUMENTS 4,311,876  1/1982  Endo et al. .
5,081,667  1/1992  Drori et al. .
5,187,810  2/1993  Yoneyama et al. .
5,191,341  3/1993  Gouard et al. ....................... 342/456
5,208,756  5/1993  Song .
5,543,789  * 8/1996  Behr et al. ............................ 340/995
5,604,676  * 2/1997  Penzias .

FOREIGN PATENT DOCUMENTS 41 395 81 A1  6/1993  (DE) .
0123562  10/1984  (EP) .
0174540  3/1986  (EP) .
0174540 A3  3/1986  (EP) .

(List continued on next page.)

OTHER PUBLICATIONS

Information for all employees of Mannesmann VDO AG "Verkehrstelematik: Ein Schritt auf dem Weg zur intelligenten Strasse" ["Traffic telematics: A Step on the way towards the intelligent road"], dated May 1994 (formerly VDO Adolf Schindling AG, D–64832 Babenhausen).

(List continued on next page.)

*Primary Examiner*—Theodore M. Blum
(74) *Attorney, Agent, or Firm*—Nixon & Vanderhye P.C.

(57) ABSTRACT

A navigation information system includes a communications system having a fixed part and at least one mobile part, the fixed part including data storage and a processor identifying the location of a mobile unit, generating guidance information appropriate to that location and transmitting it to the mobile unit. By locating most of the complexity with the service provider, in particular the navigation computer and geographical database, the system can be readily updated and the capital cost of the in-vehicle system, which in its simplest form may be a standard cellular telephone, can be minimized. The user makes a request for guidance information, and the system, having determined the user's present location, then transmits instructions to the user. The user's present location can be determined by a Satellite Positioning System or the like.

51 Claims, 4 Drawing Sheets

FOREIGN PATENT DOCUMENTS

| | | |
|---|---|---|
| 0345818 A2 | 12/1989 | (EP) . |
| 0379198 | 7/1990 | (EP) . |
| 0379198 A2 | 7/1990 | (EP) . |
| 0601293 | 6/1994 | (EP) . |
| 0601293 A2 | 6/1994 | (EP) . |
| 0604404 | 6/1994 | (EP) . |
| 0604404 A3 | 6/1994 | (EP) . |
| 2176974A | 6/1985 | (GB) . |
| 2176964 | 1/1987 | (GB) . |
| 2271486A | 10/1992 | (GB) . |
| 2264837A | 2/1993 | (GB) . |
| 2264837 | 9/1993 | (GB) . |
| 2271468 | 4/1994 | (GB) . |
| 227153 | 8/1990 | (NZ) . |
| 286906 | 3/1997 | (NZ) . |
| WO 89/12835 | 12/1989 | (WO) . |

OTHER PUBLICATIONS

"Funkschau" Journal, 22/1986, pp. 99–102.

"Telematik fur den Verkehr in Europa" ["Telematics for traffic in Europe"], accompanying brochure to the "Telematik fur den Verkehr in Europa" ["Telematics for traffic in Europe"] exhibition held on Jul. 22/23, 1994 at the Forum of the Schlosspark, Ludwigsburg, published by the Verband der Automobilindustrie e.v. (VDA), Frankfurt/Main.

Euro–Scout's . . . 93AT025, pp. 59–66, by Mr. H Sodeikat, Siemens AG.

* cited by examiner

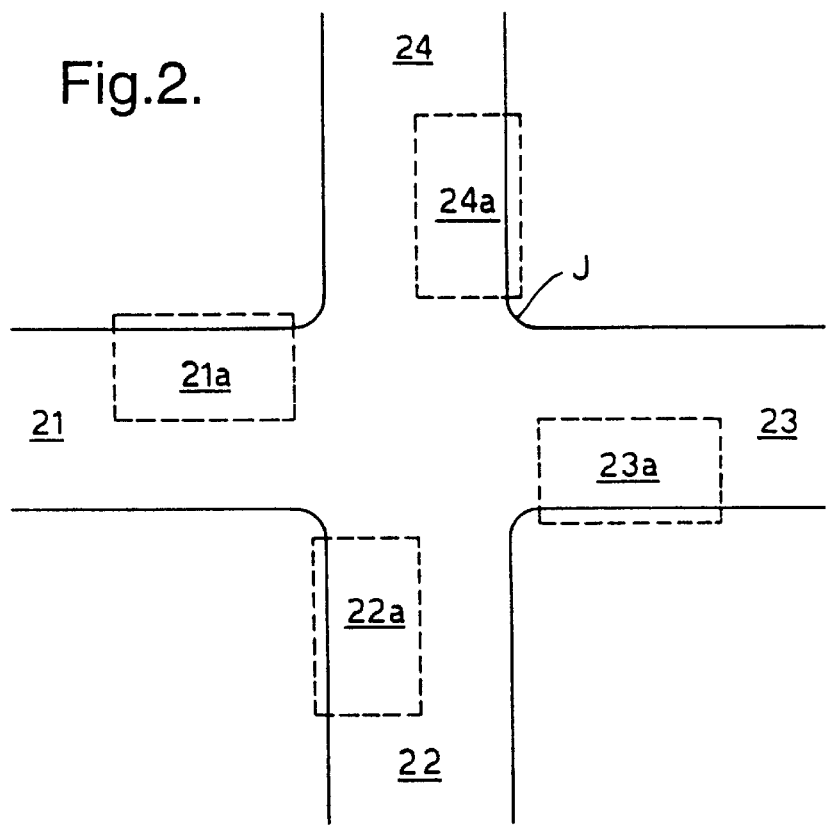
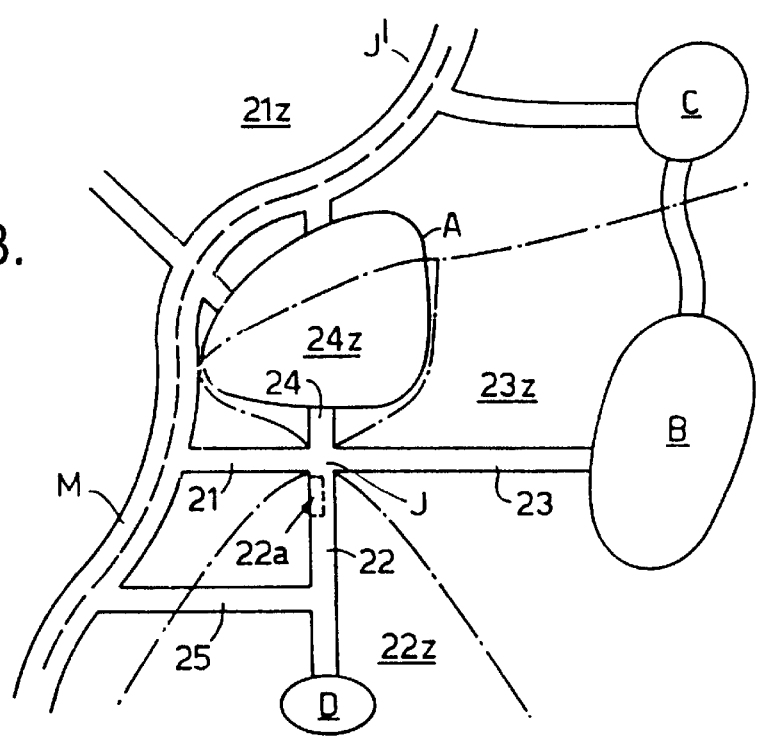

NAVIGATION INFORMATION SYSTEM

This application is related to our copending U.S. applications Ser. No. 09/041,141, filed Mar. 12, 1998 and Ser. No. 09/615,074, filed Jul. 12, 2000.

This application is the national stage of PCT/GB95/02065, filed Sep. 1, 1995.

BACKGROUND OF THE INVENTION

1. Field of the Invention

This invention relates to navigation information systems. It is particularly suitable for use in providing users of road vehicles with route guidance, but other applications are possible and are discussed below.

2. Related Art

Navigation of a vehicle through an unfamiliar complex road network is a difficult task. Large amounts of fuel and time are wasted as a result of drivers getting lost or using an inefficient route. Accidents can also be caused by drivers attempting to read maps or complex road signs and losing concentration on the road ahead. Moreover, a driver may choose an inefficient route as a result of using an out-of-date map.

An additional problem can occur even if a driver knows a route to his or her destination. That route may be congested or blocked as a result of accidents or maintenance work, so that an alternative route would be more efficient.

Several proposals have been made for navigation guidance systems. In some such proposals a vehicle-borne system has a navigation computer and a geographical information system which is essentially a digitised map stored on a CD-ROM. The system gives the driver information and guidance by screen and/or speech display. These systems would be very expensive. Each vehicle requires a navigation computer and geographical information system. The cost of the complex vehicle-borne equipment involved is estimated to be in the region of £1000. The system is complex to operate, and could only be safely operated by the driver whilst the vehicle is stationary. The geographical information system would require periodic updating, which requires new disks to be distributed to subscribers from time to time.

In some proposed systems of this type real-time data would be broadcast over a radio network to update fixed information held on the geographical information system. Even so, the geographical information system would only be accurate up to its last update. Moreover, a broadcast channel needs to be allocated for the updating service.

It has also been proposed that the guidance service provider collects statistical traffic flow data from which traffic congestion predictions can be made which are fed into the real-time data to be broadcast. The traffic flow data may be collected using roadside sensors, or they may be collected by monitoring the operation of the mobile user equipment. The latter approach can only collect data relating to users of the system, but has a lower capital cost.

In an alternative approach a system of short-range roadside beacons is used to transmit guidance information to passing vehicles equipped with simple transceivers. The beacons transmit information to suitably equipped passing vehicles to give turn instructions appropriate to their chosen destinations. For each beacon the territory to be covered is divided into as many zones as there are exits from the junction the beacon relates to. The zone in which the user's chosen destination falls is determined, and instructions are given appropriate to that zone. At any given beacon all vehicles whose destinations are in the same zone get the same instruction. The definitions of the zones are dependant on the location of the beacons, and each zone comprises the set of destinations which should be reached from the beacon by taking the direction associated with that zone.

SUMMARY OF THE INVENTION

Each beacon only gives instructions for reaching the next beacon along the route to the vehicle's destination. For two vehicles starting from the same point for different destinations for which the routes are initially coincident, the beacons along the coincident section of route will each give both users the same instructions, because for those beacons both users are travelling to the same zone. Only for the beacon at the point of divergence are the two users' destinations in different zones, and therefore different instructions are given.

The beacons programming may be modified from time to time by control signals from a central control station, in a way analogous to remotely controlled adjustable signposts, but in its interactions with the user equipment the beacon is autonomous, identifying which of its zones the user's desired destination is in, and transmitting the appropriate "turn" information to get it to the next beacon on the way. The beacon has no knowledge of the rest of the route.

Each beacon has a detailed map of a small local area (the boundaries of which are, in fact, the adjacent beacons), and if the destination is in this area the beacon gives full information of the route to the destination. The system can therefore provide a user with directions to a destination defined more precisely than the beacon spacing. However, at the beginning of a journey, a user cannot use the system until he encounters a beacon.

This proposed system allows instant updating of the guidance instructions from a central control, and simpler in-vehicle equipment, but requires vast capital expenditure in roadside beacons.

A problem encountered with both the proposed systems described above is that it is difficult for them to provide alternative routings in response to congestion, either current or future, without the risk of creating worse problems on the alternative routes. Although predictions of regularly occurring congestion peaks are relatively simple to programme into the guidance information, and, at least in the beacon system, real-time updates on road congestion can also be fed to the programming of the beacons, the control system does not have any information of vehicle movements from which to predict future congestion. In any case, if the system is in use by a significant fraction of the vehicles, the system will tend to produce congestion on the diversionary routes.

According to a first aspect of the invention, there is provided a navigation information system for providing information to a mobile user dependent on the location of the mobile user, the system comprising a mobile communications system having a fixed part and one or more mobile units for communicating with the fixed part, each mobile unit including means for transmitting to the fixed part a request for guidance information relating to a destination specified by the user of the mobile unit, and for receiving such guidance information from the fixed part, and the fixed part including: means for determining the location of a mobile unit requesting guidance information, means for generating guidance information according to the present location and specified destination of the mobile unit, and means for transmitting the guidance information so generated to the mobile unit, whereby information dependent on the present location and specified destination of the mobile unit can be transmitted to the mobile unit.

According to a second aspect of the invention, there is provided a navigation information system for providing information to one or more mobile users dependent on their locations, the system comprising: means for determining the location of a mobile unit requesting guidance information relating to a specified destination, means for generating information for guidance of the user of the mobile unit according to the present location and specified destination of the mobile unit, and a communications system for transmitting the guidance information so generated to the mobile unit, whereby guidance information dependent on the present location and specified destination of the mobile unit can be transmitted to the mobile unit.

According to a third aspect, there is provided a mobile unit for a navigation information system, comprising means for identifying the present position of the mobile unit, means for transmitting, over a communications link, a request for guidance to a specified destination, and guidance instruction means controllable by guidance instruction information received over the communications link, whereby guidance instructions between the present location and the specified location can be communicated to a user by means of the guidance instruction means.

According to a fourth aspect, there is provided a method of providing navigation guidance information to mobile units of a mobile radio system, the information being dependent on the locations of the mobile units, the method comprising the steps of: transmitting, from a mobile unit to the fixed part, a request for navigation guidance to a specified destination; determining the location of the mobile unit; generating guidance information on the basis of the location information, the requested destination, and navigation data stored in the fixed part; and transmitting the guidance information from the fixed part to the mobile unit; whereby guidance information relevant to the present location and specified destination of the mobile unit is transmitted to the mobile unit.

This invention has advantages over both the prior art systems discussed above. Considerable improvements can be made over the prior on-board navigation system proposals by putting the intelligence in the fixed part of the system. Firstly, there is no need to distribute maps or updates to subscribers because the data is held centrally. New roads can be added to the system at the instant they are opened. Total capital expenditure is minimised since all users share the same database. Moreover, the computing resources are used more efficiently, because an in-vehicle system spends most of its time inactive but a centralised system can the time-shared.

Moreover, in contrast to the prior art roadside beacon system, the invention can be implemented with little deployment of equipment in the field, thereby offering considerable economies in capital cost and maintenance, and allowing rapid installation and modification of the system to meet changing requirements.

Preferably the system includes means for determining the location of the mobile part in relation to a geographical overlay comprising a plurality of overlay areas, and means for transmitting information associated with an overlay area which includes the location of the mobile part, whereby a mobile part within that overlay area receives information associated with that overlay area. This allows information associated with a particular overlay area to be transmitted to any mobile units in that overlay area. The system may also comprise means for determining when a mobile part enters a predetermined overlay area, and means for transmitting a message, to a user other than the said mobile part, in response to the said mobile part entering the predetermined overlay area. For example, one overlay area may cover part of a road approaching a junction, and the message may be the appropriate instruction to the driver, as he approaches the junction, as to which way he should turn. Each individual overlay area therefore gives navigation instructions specific to that overlay area. The overlay areas may overlap, and may be of any size down to the practical minimum of the resolution of the location determination process. Large overlay areas are suitable for transmitting general information, whilst smaller areas can be used to target information to users in very precise locations, such as individual elements of a complicated road layout. The overlay areas may be delimited in two or three dimensions.

An advantage of this preferred arrangement over the fixed beacon systems is that the geographical overlay can be readily modified. Advantageously, the system includes means for storing a digital representation of the geographical overlay, and means for modifying the stored representation such that the configurations of the overlay areas may be selected to meet changing requirements. The overlay areas can be readily combined or subdivided, or their boundaries otherwise altered to meet changing circumstances without any modification to the hardware, simply by reconfiguring the geographical overlay defined in the central database. Moreover, unlike the prior art beacon system discussed above, there is no major cost in street furniture and supporting infrastructure, because existing cellular mobile communications systems may be used to transmit the instructions from a central database. If the driver enters an overlay area which is not on the route chosen by the system, an error message can be transmitted. Such messages may be transmitted to a user other than the mobile unit, for instance in order to monitor the whereabouts of valuable cargoes or of personnel working away from a base.

The geographical overlay may also be used to operate an access-control system, for example for site security or for levying tolls. In this arrangement, if a user enters an overlay area for which he does not have permission, an alert signal can be sent to a system controller, or to security staff on site who can intercept the interloper. Means may be provided (either in a fixed location or with the mobile user) to store a value associated with the mobile unit, and means arranged to modify the stored value in response to the messages transmitted in accordance with the location of the mobile unit, either to increment the value e.g. for subsequent billing, or to decrement the value e.g. in a prepaid stored-value device.

The fixed part may include means for storing map information or other data for use in providing information, herein referred to as guidance data, means for updating the stored guidance data, means for identifying mobile parts to which the updated data are applicable, and means for transmitting such data over the communications system to the mobile parts so identified. This allows information about changing traffic situations to be transmitted to all users who will be affected, without needing to broadcast the details to other users as would be the case with those prior art systems where updating is possible.

Although the information transmitted to the user is specific to the location, information about the user can be processed centrally. This allows short-term traffic predictions to be made. The guidance data transmitted to the mobile units can therefore be based on the position measurements of a plurality of the mobile parts. If the mobile parts are vehicles, these position measurements will identify the locations of roads, and an indication of their traffic density. As new roads are built or routes are diverted, traffic will move to the new routes. Measuring the position of the traffic will therefore result in the data being updated automatically. To reduce the volume of information transmitted, the fixed part may comprise means for transmitting to the mobile part an expected range of movement information and for receiving from the mobile part movement measurements outside the expected range, and the mobile part comprising means for measuring location and time to derive movement information, means to compare the movement information with the expected range received from a fixed part of the system, and means to automatically report to the fixed system movement measurements outside the expected range. In this way only exceptional traffic conditions are reported.

The fixed part may include means for generating and maintaining guidance data based on vehicle movement data derived from time information and position measurements of a plurality of the mobile parts and/or estimations of future locations of the mobile parts based on the guidance information previously transmitted to the mobile parts. Estimations of future locations of the mobile parts based on the guidance information previously transmitted to the mobile parts can be used to make estimates of future traffic situations.

The data stored in the data storage means may be updated, for example in response to changing traffic conditions, accidents, or highway maintenance. The system may include means for identifying the mobile units to which the updated data are applicable, and transmitting amended instructions over the communications system to said mobile parts. With knowledge of the journeys being planned by a large number of users, a better prediction of demand for particular roads (and hence of congestion on those roads) can be built up. This can be more stable than existing autonomous route-planning systems because the navigation system can take account of the journeys planned for other users.

Advantageously the invention can be implemented using a public cellular radio data service on an individual dial-up basis, providing a simple mechanism for billing and avoiding the need for a separate radio transmission system.

The means for determining the location of the mobile part may comprise means to interrogate a location-identifying means forming part of the mobile part operating for example by means of dead reckoning from a known start point, using an inertial navigation system or distance and direction measuring devices such as a compass and an odometer. Alternatively, the means for locating position may include means for identifying the location of the mobile part in relation to elements of the fixed part of the communications system. The location of the mobile part may be determined by a radio location system associated with the cellular radio system. In another alternative arrangement, a satellite navigation system may be used. In one preferred arrangement the fixed part has means to determine the approximate location of the mobile part, and the location identifying means of the mobile part is arranged to respond to a location request from the interrogation means with a non-unique location signal which, in combination with the approximate location determined by the fixed part, determines a unique location.

In a preferred arrangement, the fixed part and the mobile parts each have a satellite navigation system receiver, and the positions of the mobile parts as measured by the satellite navigation system are compared with those of the fixed part as measured by the satellite navigation system. The position of the fixed part can be known with great accuracy and provides a reference measurement which allows the position of the mobile part to be determined with greater accuracy than is possible by direct measurement using the satellite system alone.

Preferably the fixed part has one or more servers and means for allocating a server to a mobile part only when it requires service. In practice only a very small number of mobile units will require service at any given time, so this allows the computing resources of the fixed part to be used most efficiently, and the system can support many more mobile units in total than it has server capacity for. This is in contrast to the prior art system discussed above, in which each mobile unit requires a dedicated computer carried on board, which is only used for a fraction of the time. Moreover, all the servers can use a common road-use database, which can use the information on routes it has planned for mobile users to build a prediction of future road use status, such as likely congestion points, and build this into its guidance instruction process. For example the system can be arranged such that it does not direct more than a predetermined number of users to use a particular stretch of road at a particular time, and finds alternative routes for any users who would otherwise be directed along that road at that time. In this way the system can predict likely congestion points and take pre-emptive action.

The mobile part may include guidance instruction means controllable by instructions contained in the guidance information transmitted from the fixed part over the communications link, whereby guidance instructions can be communicated to the user by means of the guidance instruction means.

For some applications the vehicle may be controlled directly in response to the guidance information received over the communications link. However, for use on the public highway, it is preferable that the guidance information controls display means, which may be visual or audible or both, to indicate to a driver the direction to take.

The guidance instruction means may be programmable from the fixed part over the communications link, either automatically or by a human operator. The guidance instruction means may include a speech synthesiser, which may be located in the fixed part, transmitting voice messages to the user over the communications system, or may be located in the mobile unit and controlled by data messages from the fixed part. The former arrangement allows the mobile unit to be simplified, whilst the latter arrangement requires a smaller signalling load.

In the described embodiment the mobile part is in a vehicle, but it may be a hand-held device for guiding a pedestrian. In one form, the mobile part may be a conventional mobile cellular radio unit. This allows a basic service to be provide to a user without the need for any dedicated equipment.

BRIEF DESCRIPTION OF THE DRAWINGS

Embodiments of the invention will now be described by way of example with reference to the drawings, in which:

FIG. 2 illustrates how the invention may be applied to a simple road layout;

FIG. 3 illustrates the division of a territory into zones according to the instructions generated by the system;

DETAILED DESCRIPTION OF EXEMPLARY EMBODIMENTS

Figure 1:
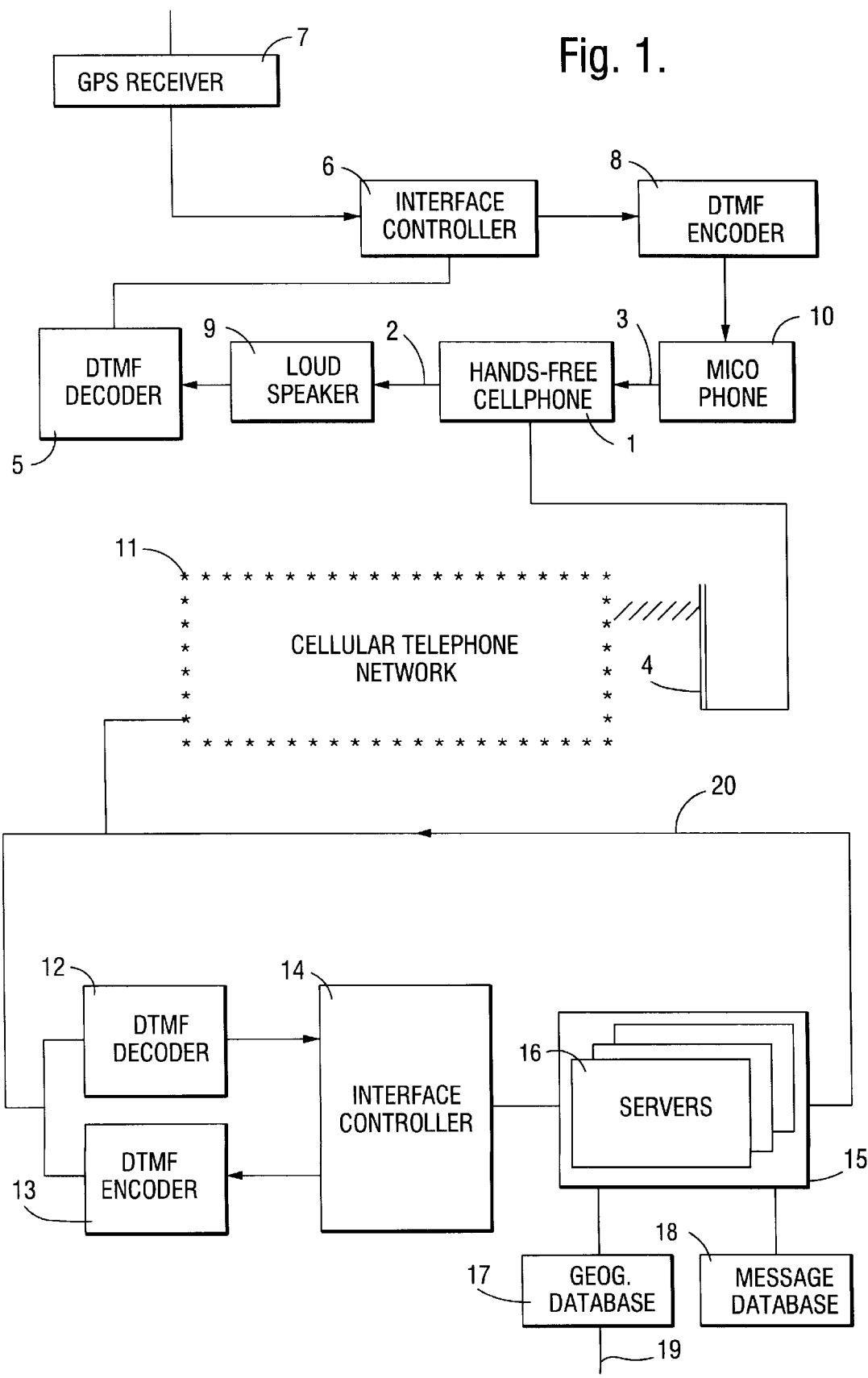
FIG. 1 shows a mobile part and a fixed part of a navigation information system according to an embodiment of the invention.

According to the embodiment of FIG. 1 the navigation system has a fixed part (comprising elements 12 to 19) and a number of mobile parts, of which one only is shown (comprising elements 1 to 10), interconnected by a cellular telephone network 11.

The mobile part comprises a mobile telephone 1 having an audio output 2, an audio input 3 and a radio antenna (transmit/receive) 4. The output 2 is connected to a decoder 5 to translate Dual-Tone Multi-Frequency (DTMF) signals received by the telephone 1 into data which is fed to an interface controller 6. The interface controller 6 also receives input from a GPS (Global Positioning System) satellite receiver 7. The interface controller transmits data to a DTMF encoder 8 which generates tones to be fed to the audio input of the mobile telephone. The audio output 2 and input 3 also include a loudspeaker 9 and microphone 10 respectively, to allow the telephone to be used for speech.

The fixed part comprises an interface with the cellular telephone network 11, connected through a DTMF decoder 12 and encoder 13 and a controller interface 14 to a computer 15. The computer 15 comprises a number of servers 16, one of which is allocated to each active mobile unit. The servers 16 have access to a geographical database 17, and a database of standard messages 18. The geographical database 17 is updateable through updating input 19. The database 17 stores the definitions of a number of overlay areas which together form a geographical overlay to the territory to be covered. Examples of overlays are illustrated in FIGS. 2, 4, 5a, 5b, and 6, to be described in detail later.

The mobile part obtains location information using the GPS receiver 7 and transmits this information, together with a request for directions to a specified destination, to the fixed part, where a server 16 relates the location information to its geographical database 17 and obtains message information associated with the location from the database 18, and transmits the information back to the mobile part.

The computer 15 may transmit messages in DTMF code, using the encoder 1 2, or it may generate voice messages which are transmitted through a voice output 20 to the cellular network 11.

DTMF signals are used to transmit the position of the vehicle to the computer 15 which can then offer information and guidance either to the vehicle or to a third party on demand.

In the following discussion, variations on the basic apparatus depicted in FIG. 1 will also be described, in which certain elements are modified or replaced.

The system is operated as follows:

At the start of a journey the driver requests service by activating a pre-dialled control on the telephone 1. This service request is transmitted to the control interface 14 over the telephone network 11. The control interface 14 then allocates a free server 16 to answer the call and interrogate the vehicle GPS receiver 7 to determine its geographical position. The encoder 8 takes the latitude and longitude data and translates the numbers into DTMF tone-pairs, in a manner to be described in more detail below.

The cellular telephone couples this audio signal into its speech input path. This is easy to do with a hands-free vehicle-mounted cellular telephone since the microphone lead is accessible or alternatively, a small transducer can be mounted next to the microphone 10. A DTMF receiver 5 coupled to the loudspeaker 9 (again acoustically or electrically) decodes supervisory data (again in DTMF format) coming back from the server 16 to acknowledge the reception of location messages. If no acknowledgement is received by the DTMF unit then the data message is repeated.

The fixed end of the system comprises a DTMF decoder 12 and encoder 13 coupled to a serial data interface 14 of the server computer 15. This computer, on the one hand, can call the mobile part which will answer automatically and then provide its location using the DTMF signalling system or on the other hand can receive an unsolicited call, which would include the DTMF encoded identity of the mobile unit and would also provide the vehicle location using the DTMF interface 6.

The server 16 then captures the current position of the user, and identifies the overlay area within which that position falls. The server also captures any permanent user-specific information such as the type of vehicle, which may be relevant for the route to be selected e.g. because of height or weight restrictions. The user may encode those requirements which are not permanent, but are specific to the present information request, (in particular his destination) by using the telephone keypad in response to voice prompts. However, in a preferred arrangement the call is presented to a human operator for the capture of this data. This allows the user to obtain assistance in identifying his desired destination to the system, and also allows the driver to speak his requirements, keeping his hands and eyes free for driving.

The operator then remotely programs the in-vehicle interface 6 with system data identifying the vehicle destination, for use in subsequent update processes, and instigates the generation of voice given directions and instructions to the driver by a speech generation subsystem of the computer server 16.

Position fixes may be made at regular intervals, e.g. every two minutes, or every kilometer. Alternatively the fixed part may request the mobile unit to send its next position fix after a specified interval or distance.

As the driver follows the route further instructions can automatically be sent as the driver enters each new overlay area and the driver can be alerted if the route has been left or if any new traffic problems have been detected that will affect the individual driver. The system is arranged such that when the system locates a mobile unit entering an overlay area having a message defined for it, for example the next turn instruction (or an error message if the mobile unit has gone off the selected route), that message is transmitted. The system may also be arranged to transmit messages to users other than the mobile unit in question, for example to monitor the progress of valuable cargoes.

At any time the driver can call the human operator if service requirements change or additional help is needed.

Because a central database is used all vehicle movements can be monitored. Traffic models can be used to optimise traffic flows and reduce journey times. The system can also ensure that it does not itself cause congestion, by limiting the number of vehicles it directs to use the same road at the same time. The control system can use the location data to calculate and record movement vectors from these vehicles.

Using the data collected by this method, it is possible for the central system to derive a digital map of valid routes. The following data could be derived automatically: valid travel lanes; permitted directions) of flow; allowable turns; average travel times; trends in travel times according to time of day and other factors.

The system would automatically update the map to show permanent changes (new road links, changes to one way systems etc.). Temporary lane closures from road works etc. would also be recorded. Manual updating of data would be necessary (for instance to alert the system to a new bypass opening) before the system acquired the information from vehicle flow data, to ensure vehicles are routed over the new road initially. Any approximations in the pre-entered data would automatically be corrected by the system described here.

The system could be further enhanced to include any other information that may be relevant to travellers, by a combination of manual and automated data entry, e.g. location of bus stops, telephone boxes and other street furniture, and proximity to enterprises such as shops, banks or offices.

The variation of transit time trends according to time of day, for each link, could be used to derive a congestion prediction model, as the basis for route guidance. The system may monitor the progress of the mobile units along the routes selected for them, to identify any areas of traffic congestion etc, by comparing actual transit times between predetermined locations. This may be done by the fixed system monitoring the location updates of individual units, or it may be done by the mobile unit, in co-operation with the fixed unit. In this latter case, the fixed part transmits an expected range of transit times within which the mobile is expected to reach a predetermined location. If the mobile unit reaches the location outside this range, it reports the fact to the fixed part. By "reporting by exception" the data processing overhead can be reduced considerably.

However, these systems can become unstable if too many drivers have access to route guidance based on information about current or predicted congestion. To avoid these instabilities route plans are created and updated centrally and passed to individual vehicles. The impact of these vehicles using the suggested routes is then added to the prediction. As more vehicles use the system the prediction produced could become more accurate.

The routes derived can be passed to the vehicles (via a mobile data link, or possibly a short range communications link or other temporary access to a fixed telecommunications network—prior to departure). The vehicle would then operate autonomously, unless the road conditions varied significantly from those predicted.

If the central system detected a problem (from vehicle data or other sources), which had a severe impact on predictions, sufficient to cause a change to advice already given, then the central system could broadcast news of the problem, such that those vehicles affected could automatically call in via a mobile data communications link to receive a new route from its present location to its destination.

If a vehicle system encountered unexpected transit times along its programmed route it would send a report to the central system.

The data flowing though the system will therefore allow it to "learn" more of the road network's characteristic congestion behaviour, e.g. by use of neural net techniques, and to select routes for traffic which avoid using routes at times when they are likely to be congested. In addition, the system can generate digital road maps or other data automatically, based on the position measurements of vehicles using the roads.

A particular advantage of this system is the ability to predict unusual patterns of congestion from the route guidance information requested by the users. Because route guidance is generated centrally, the system can monitor the number of requests for destination information to a given location. By determining the predicted arrival times for each user (which will depend on their starting points, and the time the journey started), a build-up of traffic converging on a particular location at a particular future time (e.g. for a major sporting event) can be detected. Traffic for other destinations, which might have been routed by way of this location, can then be diverted to other routes.

The system described above uses an analogue telecommunications link, in which DTMF codes may be used. For an analogue cellular radio network DTMF is an ideal signalling medium when only short status messages are required to be transmitted. It can survive in the severe signal fading and noise of the mobile environment which frequently precludes the use of fast phase or frequency shift data modulation. Another advantage is the ability to co-exist with speech. For example a DTMF data burst containing vehicle position data could be sent at the start of a call and at intervals during the call. Other simple coded DTMF messages can also be conveyed to indicate emergencies, provide simple driver indications (e.g. illuminated arrows to turn left or right) or trigger synthetic speech generated by another sub-system in the vehicle.

The DTMF coding described above is suitable for an analogue system. In a digital cellular network digitised data can be transmitted over an associated packet data system such as the Short Message Service (SMS) of GSM (Global System for Mobile Communications), or the General Packet Radio Service (GPRS) proposed for GSM.

In the embodiment described above, the speech generation subsystem forms part of the server 16. Alternatively, it can be carried on board the vehicle. In this arrangement the subsystem has various stored speech commands which are controlled from the in-vehicle interface 6 in response to commands transmitted from the fixed part. This arrangement reduces the signalling traffic required over the radio link 11, but increases the complexity of the in-vehicle equipment.

The location-determination system will now be described in greater detail. GPS (Global Positioning System) satellite navigation receivers are now becoming very cheap and are available with a serial data output. These can provide latitude and longitude data to within a tenth of a second of arc (defining position to within 3 meters, which is sufficient to identify which carriageway of a dual carriageway road a user is on), Satellite positioning systems such as the Global Positioning System (GPS) are prone to small systematic errors, for example as a result of instabilities in the orbits of the satellites. The accuracy of the position measurement may be enhanced by a process known as "Differential GPS" in which a number of fixed reference points are used, whose positions are determined with great precision e.g. using surveying techniques. GPS is used to obtain a measure of the position of one or more of the fixed reference points. This measure is compared with the known, true location to generate a correction value which can be used to correct the position of the mobile unit as measured by GPS.

The position data received from the satellite positioning system may include some redundant data. If the system is only to operate within a limited area of the globe the most significant digits of the position data are redundant, and need not be transmitted from the mobile unit to the fixed part. For example, any point in Germany can be uniquely defined by the units digits of its latitude and of its longitude, as that country lies entirely between 45 and 55 degrees North, and between 5 and 15 degrees East. It is also possible to define any point in the United Kingdom in this way, although in that case a 10 degree offset in longitude has to be applied to avoid duplication of longitudes East and West of the zero meridian.

For larger territories e.g. a pan-European system, or one covering the USA, this simple method of data reduction is impractical. However, it is nevertheless possible to reduce the data requirements by dynamically defining the territory. After an initialisation step using the full location, the system selects as each new location the closest candidate to the previous one. For example, if the mobile unit was last reported at 99 degrees W and the units digit of the longitude is now 0, the user is taken to be at 100 degrees W rather than, for example, 90 degrees or 110 degrees.

If location updates take place sufficiently frequently that the user's position cannot have changed by more than half a degree, the units digit of degrees may also be dispensed with, and the location given only in minutes and seconds of arc. The more frequent the updates, the more digits can be dispensed with.

An alternative method of obtaining the coarse position location is interrogation of the cellular radio system's operating system to identify the cell in which the user is currently located. Cell sizes can be up to about 40 km across (although they are often much smaller, so identifying the cell can identify the user's location to within 40 km, which identifies latitude to better than half a degree. (1 degree of latitude=111 km). The separation of lines of longitude varies with the cosine of the latitude but even at the Arctic Circle (66 degrees North) a 40 km resolution will identify longitude to the nearest whole degree (1 degree of longitude=111 km (cos latitude)=approximately 45 km at 66 degrees North).

By left-truncating the position data by omitting the degrees digits a basic position message would therefore consist of 10 decimal digits (minutes, seconds, and tenths of seconds). Altitude data giving altitude in meters would require a further four digits, since all points on the Earth's surface lie within a range of 10,000 meters, but this data can also be left-truncated, as it is unlikely that any multi-level road system would exceed 100 meters in height (or if it did, that a GPS system would work effectively for any receiver on the lower levels). This gives a total of twelve digits, which can be transmitted by DTMF in less than 2 seconds.

If the data is left-truncated as described above, the "coarse" data is added by the interface controller 14 by reference to the previous position or to the cellular radio operating system.

When the computer 15 receives a location message, it stores the location and then searches its database for an overlay area within which that position lies. The overlay areas are defined in the database by co-ordinates of latitude and longitude and have associated attributes which define messages which can be passed to mobile subscribers within the overlay area defined. In some instances height (altitude) information, also available using satellite positioning systems, may be used, for example to distinguish between levels in a multi-level highway intersection. When a DTMF location message has co-ordinates which fall inside an overlay area having an associated message, the message is then transmitted to the mobile part as a computer synthesised speech message, a DTMF coded message (to activate other subsystems) or as a high speed conventional data message.

If the mobile unit fell within the same overlay area at the previous location update, and the message associated with that overlay area is unchanged, the transmission of the message may be suspended.

The frequency at which location updates are requested by the system may be tailored to the size and nature of the current overlay area. For example, an intricate road layout may comprise a large number of small overlay areas, requiring frequent location updates to ensure that a user does not miss an instruction by passing through its associated area between two updates. However, a long stretch of road without junctions may be covered by a single overlay area, so less frequent updates are appropriate. The speed with which a vehicle is likely to be moving, which will differ between urban, rural, and motorway environments may also be used as a factor in determining when the next location update should be requested.

As suggested above, there may be circumstances when a satellite positioning system may be unusable, for example in tunnels or built-up areas where a line-of-sight view of the satellites may be impossible to obtain. Alternative arrangements for identifying and updating the mobile part's location which do not rely on a satellite receiver may be used, either on their own, or to interpolate between points where a satellite system can be used. In one variant, a navigation system based on dead-reckoning may be used. In such systems the user identifies his initial location and the on-board system measures the system's movement e.g. by magnetic bearing measurements, distance counters, and inertial navigation means such as gyrocompasses and accelerometers. Such systems are self-contained, but require knowledge of the starting point. This may be obtained, for example from a satellite positioning system.

In another variant, a method of location may be used which relies on the propagation characteristics of the cellular radio system used for communication with the central control station. Examples of such systems are disclosed in German Patent specifications DE3825661 (Licentia Patent Verwaltungs) and DE 3516357 (Bosch), U.S. Pat. No. 4,210, 913 (Newhouse), European Patent specification EP0320913 (Nokia), and International Patent applications WO92/13284 (Song) and WO 88/01061 (Ventana). By comparison of signal strength or other characteristics of several cellular base stations, a position fix can be determined. In this arrangement the location measurement may be made directly by the fixed system. This allows the mobile part of the system to be embodied by a conventional cellular telephone, with inputs being provided by speech, or by DTMF tones generated by the keypad, and instructions to the user being transmitted by voice commands.

Figure 4:
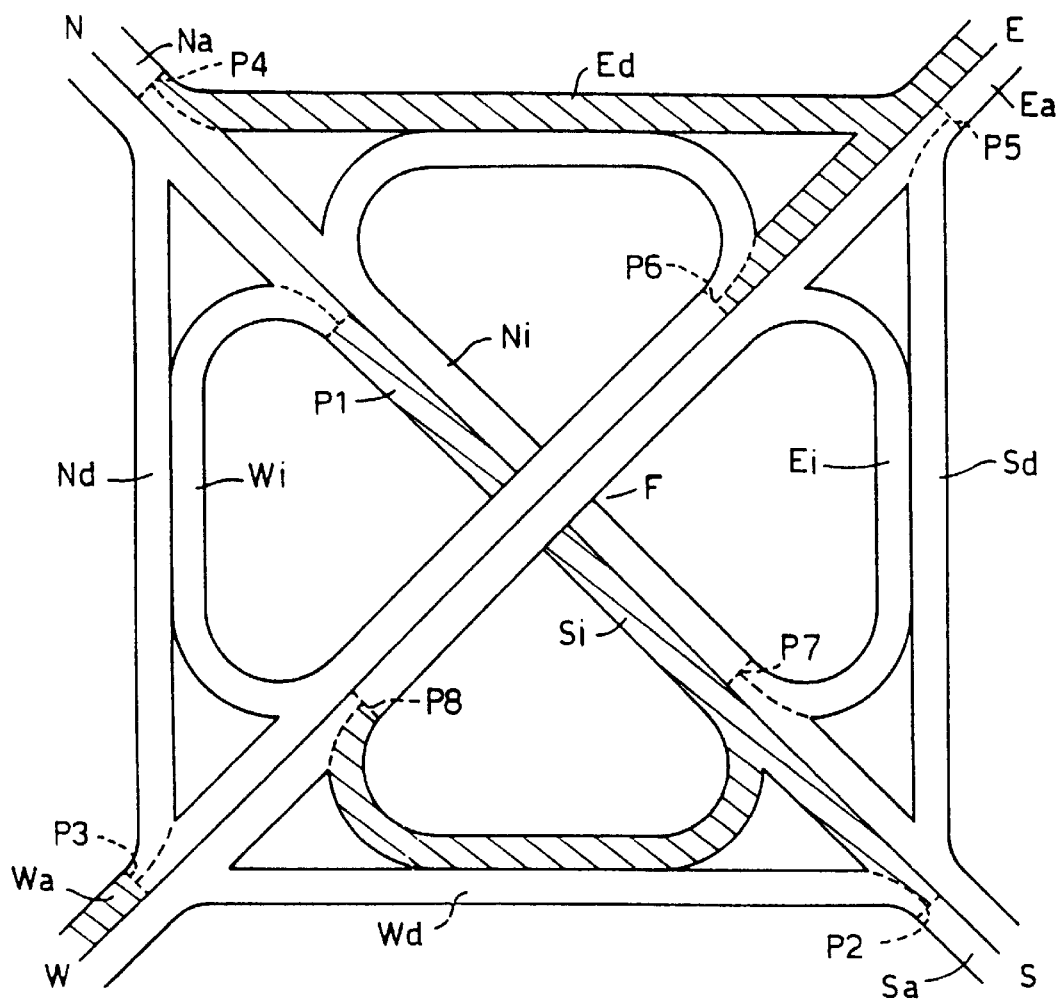
FIG. 4 illustrates an application of the invention to a more complex road layout.
Figure 5A:
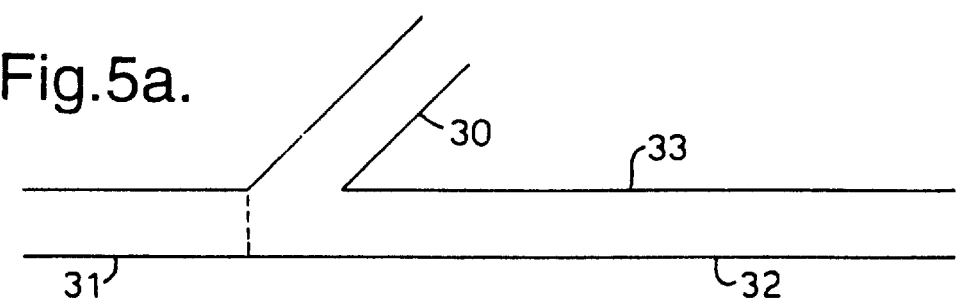
FIGS. 5a and 5b illustrate the modification of an overlay in response to a change in traffic circumstances.
Figure 5B:
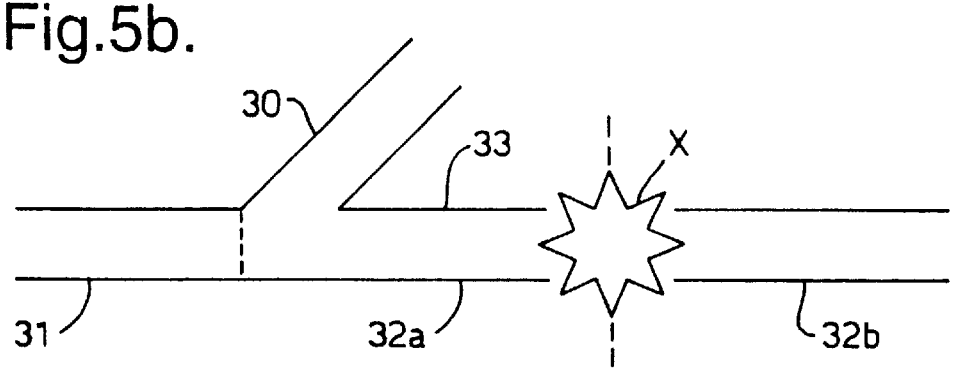
Figure 6:
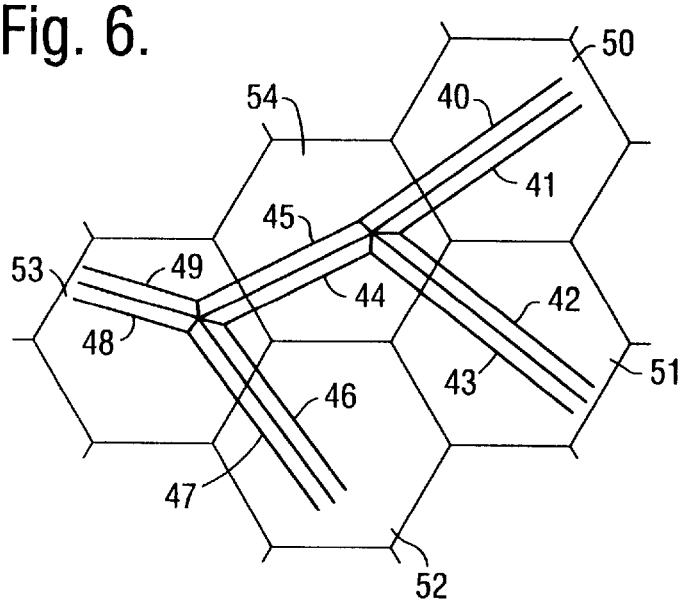
FIG. 6 illustrates a road network, showing overlay areas defined by the method of the invention in relation to a cellular radio network

Examples of the kind of navigation information which may be stored in the database 17 will now be discussed, with reference to FIGS. 2 to 6. Briefly, FIG. 2 shows a junction J having four approach roads 21, 22, 23, 24; each having associated with it an overlay area 21*a*, 22*a*, 23*a*, 24*a* respectively. In this figure, and all other figures illustrating road layouts, the roads are shown arranged for lefthand running, as used for example in the UK, Japan, Australia etc. FIG. 3 shows part of a road network surrounding the junction J, including towns A, B, C, and a motorway M. Each of the roads 21, 22, 23, 24 has an associated destination zone 21*z* etc. FIG. 4 shows a complex grade-separated junction interlinking four roads N, S, E, W. The junction has superimposed on it an overlay having twelve overlay areas, Na, Ni, Nd, Sa, Si, Sd, Ea, Ei, Ed, Wa, Wi, Wd. FIG. 5a shows a small region having a main road 33 and a side road 30. The main road 33 has two associated overlay areas 31, 32. FIG. 5b is similar to FIG. 5a, but an obstruction X is present on the main road 33, and the overlay area 32 has been subdivided into two overlay areas 32a, 32b, separated by the obstruction. FIG. 6 shows an overlay comprising ten overlay areas 40–49 superimposed on a cellular radio coverage region comprising five cells 50–54.

In greater detail, the road junction J (FIG. 2) has four approach roads 21, 22, 23, 24. On each road, at the approach to the junction, an overlay area (21a, 22a, 23a, 24a) is defined. These overlay areas have directional information associated with them, giving turn instructions or other navigational information. As shown in FIG. 3, the entire territory covered by the navigation system can be divided into four zones 21z, 22z, 23z, 24z, each comprising the set of all locations for which the corresponding road 21, 22, 23, 24 should be taken from the junction J. In this particular example, road 24 leads directly into town A and is only used for local destinations (zone 24z), road 23 leads to town B (zone 23z), road 22 leads to town D (zone 22z) and road 21 leads to the motorway M, for all other destinations including town C and part of town A. These zones are defined differently for each junction: for example at junction J' different directions are appropriate for towns A and C, so these towns fall in different zones with respect to the overlay areas at that junction. The zones may even be defined differently for different overlay areas at the same junction. For example, if U-turns are not possible at the junction J, any traffic approaching the junction J by road 22 and requiring town D (perhaps as the result of a previous error, or a change of plan) must be routed by way of roads 21, M, and 25. Thus, for overlay area 22a there are only three zones: 24z, 23z and the combined 21z/22z, corresponding to the three permitted exits 21, 23, 24.

The zones may be re-defined according to circumstances. For example, when the motorway M is congested, the best route from junction J to town C may be by way of town B. In such circumstances, zones 21z and 23z are redefined so that town C now falls within zone 23z. It should be noted, however, that the total number of zones remains the number of exit routes from the relevant overlay area.

The overlay areas 21a, 22a, 23a, and 24a should be large enough to ensure that any vehicle approaching the junction gets at least one location update whilst within the relevant overlay area, and is thus sent the relevant turn instruction. As shown in FIG. 2, these overlay areas are discrete, and may be considered equivalent to the coverage areas of the beacons of the prior art system discussed above. They may, however, be made contiguous, as shown in FIGS. 4, 5a, 5b and 6.

FIG. 4 shows a more complex, grade-separated junction, in which there are twelve overlay areas Each road N, E, S, W intersecting at the junction has a corresponding approach overlay area Na, Ea, Sa, Wa, (Wa shown shaded), and a depart overlay area Nd, Ed, Sd, Wd (Ed shown shaded). There are also four intermediate overlay areas Ni, Ei, Si, Wi (Si shown shaded). In the vicinity of the flyover F height (altitude) information obtainable from the GPS system can be used to determine which level, and therefore which overlay area, the user is currently in.

The approach and intermediate overlay areas each end at a decision point P1 to P8. In the database 17 each overlay area has direction information associated with it, providing instructions as to which fork to take at the associated decision point. For example, the direction information associated with zone Si instructs users for destinations served by road N to go straight on at point P1, and users for destinations served by roads E, S, and W to turn left. It will be seen that traffic using the intersection will pass through one approach overlay area, one departure overlay area, and may also pass through one or more intermediate overlay areas. There may also be information associated with the departure overlay areas Nd, Sd, Ed, Wd, for example warning of hazards ahead. The departure overlay areas may be continuous with approach overlay areas for the next junction in each direction.

As a user approaches the junction on road S, a location update identifies the user equipment as being within overlay area Sa. If the co-ordinates of the user's destination are within the zone served by road W, the user is sent an instruction to turn left at point P2. If the user obeys this instruction, he will enter overlay area Wd and on the next location update he will be sent information relevant to that overlay area (if any).

If the co-ordinates of the user's destination are within the zone served by road N, the user in overlay area Sa is instead sent an instruction to continue straight on at point P2. If the user obeys this instruction, he will enter overlay area Si.

For a user in overlay area Si, if the co-ordinates of the user's destination are within the zone served by road N the user is sent an instruction to go straight on at point P1. On obeying this instruction, he will enter the overlay area Nd and on the next location update he will be sent information relevant to that overlay area (if any).

If the co-ordinates of the destination of a user in overlay area Si are in the zone served by roads E, S, or W, the user will be sent an instruction to turn left at point P1. On obeying this instruction, he will enter overlay area Wi.

Similar information is associated with the other overlay areas. By being given appropriate instructions as the user negotiates a succession of junctions (decision points), the user can be directed to any destination. It should be noted that all users who are to be directed to the same exit from the junction are given the same instruction, whatever their ultimate destination.

FIGS. 5a and 5b illustrate the reconfiguration of the overlay areas to meet changing circumstances. Initially (FIG. 5a) an overlay area 31 is defined for the approach to a junction between a major road 33 and a side road 30, and a second overlay area 32 is defined for that part of the major road 33 beyond the junction. Information associated with the overlay area 31 includes turn information to instruct traffic for the zone served by the side road 30 to turn off. Information may also be associated with the overlay area 32.

In FIG. 5b the major road 33 has been blocked at a point X. In order to accommodate this, the overlay area 32 has been subdivided into two overlay areas 32a, 32b. The information (if any) associated with overlay area 32b is the same as that previously associated with overlay area 32. Traffic in overlay area 32a is given new information warning it of the hazard ahead. The information associated with the overlay area 31 is modified, so that all traffic is now instructed to turn off onto the side road 30. (Effectively this means that the destination zones associated with the overlay area 31 are merged into one)

FIG. 6 shows how the overlay areas may be defined for a road network. In this example there is an overlay area 40, 41, 42, 43, 44, 45, 46, 47, 48, 49 corresponding to each side of each section of road. Information appropriate to each direction of travel on each section is Therefore available to users throughout the relevant section. Superimposed on this overlay there is a cellular radio network, five cells of which (50, 51, 52, 53, 54) are shown. The position of the user, as determined for example by a satellite positioning system, determines which overlay area is appropriate to the user. The information is transmitted to the service control centre by means of the cellular radio network. Handovers between cellular base stations occur in conventional manner at cell boundaries. These handovers are, however, unrelated to the boundaries between the overlay areas 40–49

Although the described embodiment relates to the provision of route guidance information, other locality-dependant information may be provided as well, or instead, such as information about local facilities, tourist attractions, weather forecasts, public transport information, etc. The term "guidance information", as used in this specification, embraces any such information.

What is claimed is:

1. A navigation information system for providing information to a mobile user dependent on the location of the mobile user, the system comprising:

a mobile communications system having a fixed part and a plurality of mobile parts for communicating with the fixed part, each mobile part including means for transmitting to the fixed part of a request for guidance information relating to a destination specified by the user of the mobile part, and for receiving such guidance information from the fixed part, and the fixed part including:

means for determining the location of a mobile a requesting guidance information, means for generating guidance information according to the present location and specified destination of the mobile part, and means for transmitting the guidance information so generated to the mobile part, whereby information dependent on the location and specified destination of the mobile part is transmitted to the mobile part, means for determining the location of the mobile part in relation to a geographical overlay comprising a plurality of discrete predetermined overlay areas, and means for transmitting guidance information associated with an overlay area which includes the location of at least one mobile part, whereby mobile parts within that overlay area simultaneously receive the same guidance information associated with that overlay area.

2. A system as in claim 1 including:

means for storing a digital representation of the geographical overlay, and means for modifying the stored representation such that the configurations of the overlay areas may be selected to meet changing requirements.

3. A system as in claim 1 including;

means for determining when a mobile part enters a predetermined overlay area, and means for transmitting a message to the mobile part in response to the mobile part entering the predetermined overlay area.

4. A system as in claim 3, including:

means to store a value associated with the mobile part, and means arranged to modify the stored value in response to the message.

5. A system as in claim 1 including:

means for determining when a mobile part enters a predetermined overlay area, and means for transmitting a message, to a user other than the said mobile part, in response to the said mobile part entering the predetermined overlay area.

6. A system as in claim 1 having means for locating the position of the mobile part by radio location.

7. A navigation information system for providing information to a mobile user dependent on the location of the mobile user, the system comprising:

a mobile communications system having a fixed part and a plurality of mobile parts for communicating with the fixed part, each mobile part including means for transmitting to the fixed part a request for guidance information relating to a destination specified by the user of the mobile part and for receiving such guidance information from the fixed part, and the fixed part including:

means for determining the location of a mobile part requesting guidance information, means for generating guidance information according to the present location and specified destination of the mobile part, and means for transmitting the guidance information so generated to the mobile part, whereby information dependent on the location and specified destination of the mobile part is transmitted to the mobile part, means for determining the location of the mobile part in relation to a geographical overlay comprising a plurality of discrete predetermined overlay areas, and means for transmitting guidance information associated with an overlay area which includes the location of at least one mobile part, whereby mobile parts within that overlay area simultaneously receive the same guidance information associated with that overlay area, means for locating the position of the mobile part by radio location, wherein the means for locating position comprises:

a satellite navigation system receiver, and means for identifying the location of the mobile part in relation to elements of the fixed part of the communications system.

8. A navigation information system for providing information to a mobile user dependent on the location of the mobile user, the system comprising:

a mobile communications system having a fixed part and a plurality of mobile parts for communicating with the fixed part, each mobile part including means for transmitting to the fixed part a request for guidance information relating to a destination specified by the user of the mobile part and for receiving such guidance information from the fixed part, and the fixed part including:

means for determining the location of a mobile part requesting guidance information, means for generating guidance information according to the present location and specified destination of the mobile part, and means for transmitting the guidance information so generated to the mobile part, whereby information dependent on the location and specified destination of the mobile part is transmitted to the mobile part, means for determining the location of the mobile part in relation to a geographical overlay comprising a plurality of discrete predetermined overlay areas, and means for transmitting guidance information associated with an overlay area which includes the location of at least one mobile part, whereby mobile parts within that overlay area simultaneously receive the same guidance information associated with that overlay area, and means for locating the position of the mobile part by radio location and comprising at least one of:

(a) a satellite navigation system receiver, and (b) means for identifying the location of the mobile part in relation to elements of the fixed part of the communications system.

9. A system as in claim 1, wherein:

the means for determining the location of the mobile part comprises means to interrogate a location-identifying means forming part of the mobile part.

10. A system as in claim 9, wherein:

the fixed part has means to determine the approximate location of the mobile part, and the location identifying means of the mobile part is arranged to respond to a location request from the interrogation means with a non-unique location signal which, in combination with the approximate location determined by the fixed part, determines a unique location.

11. A navigation information system for providing information to a mobile user dependent on the location of the mobile user, the system comprising:

a mobile communications system having a fixed part and a plurality of mobile parts for communicating with the fixed part, each mobile part including means for transmitting to the fixed part a request for guidance information relating to a destination specified by the user of the mobile part and for receiving such guidance information from the fixed part, and the fixed part including:

means for determining the location of a mobile part requesting guidance information, means for generating guidance information according to the present location and specified destination of the mobile part, and means for transmitting the guidance information so generated to the mobile part, whereby information dependent on the location and specified destination of the mobile part is transmitted to the mobile part, means for determining the location of the mobile part in relation to a geographical overlay comprising a plurality of discrete predetermined overlay areas, and means for transmitting guidance information associated with an overlay area which includes the location of at least one mobile part, whereby mobile parts within that overlay area simultaneously receive the same guidance information associated with that overlay area, wherein the mobile part has means for location its position by dead reckoning.

12. A navigation information system for providing information to a mobile user dependent on the location of the mobile user, the system comprising:

a mobile communications system having a fixed part and a plurality of mobile parts for communicating with the fixed part, each mobile part including means for transmitting to the fixed part a request for guidance information relating to a destination specified by the user of the mobile part and for receiving such guidance information from the fixed part, and the fixed part including:

means for determining the location of a mobile part requesting guidance information, means for generating guidance information according to the present location and specified destination of the mobile part, and means for transmitting the guidance information so generated to the mobile part, whereby information dependent on the location and specified destination of the mobile part is transmitted to the mobile part, means for determining the location of the mobile part in relation to a geographical overlay comprising a plurality of discrete predetermined overlay areas, and means for transmitting guidance information associated with an overlay area which includes the location of at least one mobile part, whereby mobile parts within that overlay area simultaneously receive the same guidance information associated with that overlay area, wherein the fixed part includes means for generating and maintaining guidance data based on vehicle movement data derived from time information and position measurements of a plurality of the mobile parts and estimations of future locations of the mobile parts based on the guidance information previously transmitted to the mobile parts.

13. A system as in claim 1 wherein:

the fixed part comprises means for transmitting to the mobile part an expected range of movement information and for receiving from the mobile part movement measurements outside the expected range, and the mobile part comprises:

means for measuring location and time to derive movement information, means to compare the movement information with the expected range received from a fixed part of the system, and means to automatically report to the fixed system movement measurements outside the expected range.

14. A system as in claim 1, wherein the fixed part includes:

means for storing guidance data, means for updating the stored guidance data, means for identifying mobile parts to which the updated data are applicable, and means for transmitting such data over the communications system to the mobile parts to identified.

15. A system as in claim 1, wherein:

the mobile part includes guidance instruction means controllable by instructions contained in the guidance information transmitted from the fixed part over the communications link, whereby guidance instructions can be communicated to the user by means of the guidance instruction means.

16. A system as in claim 1, wherein:

the fixed part has input means operable by a human operator to input guidance instruction requests to the fixed part.

17. A navigation information system for providing information to a mobile user dependent on the location of the mobile user, the system comprising:

a mobile communications system having a fixed part and a plurality of mobile parts for communicating with the fixed part, each mobile part including means for transmitting to the fixed part a request for guidance information relating to a destination specified by the user of the mobile part and for receiving such guidance information from the fixed part, and the fixed part including:

means for determining the location of a mobile part requesting guidance information, means for generating guidance information according to the present location and specified destination of the mobile part, and means for transmitting the guidance information so generated to the mobile part, whereby information dependent on the location and specified destination of the mobile part is transmitted to the mobile part, means for determining the location of the mobile part in relation to a geographical overlay comprising a plurality of discrete predetermined overlay areas, and means for transmitting guidance information associated with an overlay area which includes the location of at lest one mobile part, whereby mobile parts within that overlay area simultaneously receive the same guidance information associated with that overlay area, wherein the fixed part includes means for generating and maintaining guidance data based on at least one of:

(a) vehicle movement data derived from time information and position measurements of a plurality of the mobile parts, and (b) estimations of future locations of the mobile parts based on the guidance information previously transmitted to the mobile parts.

18. A system as in claim 1, wherein the guidance information transmitted to the mobile part comprises instructions for decisions at road junctions.

19. A navigation information system for providing information to each of plural mobile users dependent on their locations, the system comprising:

means for determining the location of a mobile part requesting guidance information relating to a specified destination, means for generating information for guidance of the user of a mobile part according to the present location and specified destination of the mobile part, and a communications system for transmitting the guidance information so generated to the mobile part, whereby guidance information dependent on the present location and specified destination of the mobile part is transmitted to the mobile part, means for determining the location of a mobile part in relation to a geographical overlay comprising a plurality of discrete predetermined overlay areas, and means for transmitting guidance information associated with an overlay area which includes the location of at least one mobile part, whereby mobile parts within that overlay area simultaneously receive the same guidance information associated with that overlay area.

20. A system as in claim 19 including;

means for storing a digital representation of the geographical overlay, and means for modifying the stored representation such that the configurations of the overlay areas may be selected to meet changing requirements.

21. A system as in claim 19 including:

means for determining when a mobile unit enters a predetermined overlay area, and means for transmitting a message to the mobile unit in response to the mobile unit entering the predetermined overlay area.

22. A system as in claim 20, including means to store a value associated with the mobile unit, and means arranged to modify the stored value in response to the message.

23. A system as in claim 19 including:

means for determining when a mobile unit enters a predetermined overlay area, and means for transmitting a message, to a user other than the said mobile unit, in response to the said mobile unit entering the predetermined overlay area.

24. A system as in claim 19, wherein the means for determining the location of a mobile unit includes means to interrogate a location-identifying means of a co-operating mobile unit to determine its position.

25. A system as in claim 19, wherein:

the means for locating position comprises means for identifying the location of the mobile unit in relation to elements of the fixed part of the communications system.

26. A system as in claim 25, wherein the means for locating position comprises:

means to determine the approximate location of the mobile unit, means to receive a non-unique location signal from the mobile unit, and means to combine the approximate location information with the non-unique location information to determine a unique location.

27. A system as in claim 19, including:

means for generating and maintaining guidance data based on vehicle movement date derived from time information and position measurements of a plurality of the mobile parts.

28. A system as in claim 19 having means for transmitting to the mobile part an expected range of movement information, and for receiving from the mobile part movement measurements outside the expected range.

29. A system as in claim 19 including:
means for storing guidance data,
means for updating the stored guidance data,
means for identifying mobile units to which the updated data are applicable, and
means for transmitting such data over the communications system to the mobile units so identified.

30. A system as in claim 19 having input means operable by a human operator to input guidance instruction requests.

31. A system as in claim 19, wherein the guidance information transmitted to the mobile part comprises instructions for decisions at road junctions.

32. A mobile unit for a navigation information system, said mobile unit comprising:
means for identifying the present position of the mobile unit,
means for transmitting, over a communications link, a request for guidance to a specified destination, and
guidance instruction means controllable by guidance instruction information received over the communications link and associated with one of a plurality of discrete predetermined geographical overlay areas containing said present position,
whereby guidance instructions between the present location and the specified location are communicated to a user by means of the guidance instruction means.

33. A mobile unit as in claim 32, further comprising:
means for measuring the location of the mobile unit, and time, to derive movement information,
means to compare the movement information with an expected range received from a fixed part of the system, and
means to automatically report to the fixed system movement measurements outside the expected range.

34. A mobile unit as in claim 32, wherein the guidance instructions comprise instructions for decisions at road junctions.

35. A method of providing navigation guidance information to mobile parts of a mobile radio system, the information being dependent on the locations of the mobile parts, the method comprising the steps of:
transmitting, from a mobile part to the fixed part, a request for navigation guidance to a specified destination,
determining the location of the mobile part;
generating guidance information on the basis of the location information, the requested destination, and navigation data stored in the fixed part; and
transmitting the guidance information from the fixed part to the mobile part;
whereby guidance information relevant to the present location and specified destination of the mobile part is transmitted to the mobile part;
determining the location of the mobile part in relation to a geographical overlay comprising a plurality of discrete predetermined overlay areas,
generating guidance information associated with an overlay area which includes the location of at least one mobile part, and
transmitting guidance information associated with the relevant overlay area to mobile parts within that overlay area,
whereby mobile parts within that overlay area simultaneously receive the same guidance information associated with that overlay area.

36. A method as in claim 35 including the steps of:
storing a digital representation of the geographical overlay, and
modifying the stored representation such that the configurations of the overlay areas may be selected to meet changing requirements.

37. A method as in claim 35 comprising the further steps of:
determining when a mobile unit enters a predetermined overlay area, and
transmitting a message to the mobile unit in response to the mobile unit entering the predetermined overlay area.

38. A method as in claim 37 including the further step of modifying a stored value associated with the mobile unit in response to the message.

39. A method as in claim 35 including the further steps of:
determining when a mobile unit enters a predetermined overlay area, and
transmitting a message to a user other than the said mobile unit in response to the mobile unit entering the predetermined overlay area.

40. A method as in claim 35, wherein the position of the mobile unit is identified by a radio location method.

41. A method of providing navigation guidance information to mobile parts of a mobile radio system, the information being dependent on the locations of the mobile parts, the method comprising:
transmitting, from a mobile part to the fixed part, a request for navigation guidance to a specified destination,
determining the location of the mobile part;
generating guidance information on the basis of the location information, the requested destination, and navigation data stored in the fixed part; and
transmitting the guidance information from the fixed part to the mobile part;
whereby guidance information relevant to the present location and specified destination of the mobile part is transmitted to the mobile part;
determining the location of the mobile part in relation to a geographical overlay comprising a plurality of discrete predetermined overlay areas,
generating guidance information associated with an overlay area which includes the location of at least one mobile part, and
transmitting guidance information associated with the relevant overlay area to mobile parts within that overlay area,
whereby mobile parts within that overlay area simultaneously receive the same guidance information associated with that overlay area,
wherein the position of the mobile part is identified by a radio location method, and
wherein the position of the mobile part is determined by means of a satellite navigation system and by identifying the location of the mobile part in relation to elements of the fixed part of the communications system.

42. A method as in claim 40, wherein the position of the mobile unit is determined by at least one of:
(a) use of a satellite navigation system and
(b) by identifying the location of the mobile part in relation to elements of the fixed part of the communications system.

43. A method as in claim 35, wherein the fixed unit interrogates the mobile unit to identify its location.

44. A method as in claim 43 wherein:
the fixed part determines the approximate location of the mobile part, and
the mobile part responds to a location request from the interrogation means with a non-unique location signal which, in combination with the approximate location determined by the fixed part, determines a unique location.

45. A method of providing navigation guidance information to mobile parts of a mobile radio system, the information being dependent on the locations of the mobile parts, the method comprising:
transmitting, from a mobile part to the fixed part, a request for navigation guidance to a specified destination,
determining the location of the mobile part;
generating guidance information on the basis of the location information, the requested destination, and navigation data stored in the fixed part; and
transmitting the guidance information from the fixed part to the mobile part;
whereby guidance information relevant to the present location and specified destination of the mobile part is transmitted to the mobile part;
determining the location of the mobile part in relation to a geographical overlay comprising a plurality of discrete predetermined overlay areas,
generating guidance information associated with an overlay area which includes the location of at least one mobile part, and
transmitting guidance information associated with the relevant overlay area to mobile parts within that overlay area,
whereby mobile parts within that overlay area simultaneously receive the same guidance information associated with that overlay area,
wherein the mobile part identifies its position by dead reckoning.

46. A method of providing navigation guidance information to mobile parts of a mobile radio system, the information being dependent on the locations of the mobile parts, the method comprising:
transmitting, from a mobile part to the fixed part, a request for navigation guidance to a specified destination,
determining the location of the mobile part,
generating guidance information on the basis of the location information, the requested destination, and navigation data stored in the fixed part, and
transmitting the guidance information from the fixed part to the mobile part;
whereby guidance information relevant to the present location and specified destination of the mobile part is transmitted to the mobile part;
determining the location of the mobile part in relation to a geographical overlay comprising a plurality of discrete predetermined overlay areas,
generating guidance information associated with an overlay area which includes the location of at least one mobile part, and
transmitting guidance information associated with the relevant overlay area to mobile parts within that overlay area,
whereby mobile parts within that overlay area simultaneously receive the same guidance information associated with that overlay area,
generating and maintaining data based on vehicle movement data derived from time information and position measurements of a plurality of the mobile parts and estimations of future locations of the mobile parts based on the guidance information previously transmitted to the mobile parts.

47. A method as in claim 35 wherein:
the fixed part transmits to the mobile part an expected range of movement information, and
the mobile part measures location and time to derive movement information, compares the movement information with the expected range received from the fixed part of the system, and reports to the fixed system movement measurements outside the expected range.

48. A method as in claim 35 including the further steps of:
updating the stored data,
identifying the mobile units to which the updated data are applicable, and
transmitting such data over the communications system to said applicable mobile parts.

49. A method as in claim 35, wherein the guidance information transmitted to the mobile unit controls guidance instruction means forming part of the mobile unit, whereby guidance instructions can be communicated to the user of the mobile unit.

50. A method of providing navigation guidance information to mobile parts of a mobile radio system, the information being dependent on the locations of the mobile parts, the method comprising:
transmitting, from a mobile part to the fixed part, a request for navigation guidance to a specified destination,
determining the location of the mobile part;
generating guidance information on the basis of the location information, the requested destination, and navigation data stored in the fixed part; and
transmitting the guidance information from the fixed part to the mobile part;
whereby guidance information relevant to the present location and specified destination of the mobile part is transmitted to the mobile part;
determining the location of the mobile part in relation to a geographical overlay comprising a plurality of discrete predetermined overlay areas,
generating guidance information associated with an overlay area which includes the location of at least one mobile part, and
transmitting guidance information associated with the relevant overlay area to mobile parts within that overlay area,
whereby mobile parts within that overlay area simultaneously receive the same guidance information associated with that overlay area, and
including at least one of:
(a) generating and maintaining data based on vehicle movement data derived from time information and position measurements of a plurality of the mobile parts and
(b) estimations of future locations of the mobile parts based on the guidance information previously transmitted to the mobile parts.

51. A method as in claim 35, wherein the guidance information transmitted to the mobile part comprises instructions for decisions at road junctions.

* * * * *

US006169515C1

(12) EX PARTE REEXAMINATION CERTIFICATE (10408th)

United States Patent
Mannings et al.

(10) Number: US 6,169,515 C1
(45) Certificate Issued: Nov. 17, 2014

(54) NAVIGATION INFORMATION SYSTEM

(75) Inventors: Robin Thomas Mannings, Ipswich (GB); Nigel David Charles Wall, Ipswich (GB)

(73) Assignee: British Telecommunications Public Limited Company, London (GB)

Reexamination Request:
No. 90/012,347, Jun. 12, 2012

Reexamination Certificate for:
Patent No.: 6,169,515
Issued: Jan. 2, 2001
Appl. No.: 08/793,502
Filed: Mar. 20, 1997

(21) Appl. No.: 90/012,347

(22) PCT Filed: Sep. 1, 1995

(86) PCT No.: PCT/GB95/02065
§ 371 (c)(1),
(2), (4) Date: Mar. 20, 1997

(87) PCT Pub. No.: WO96/07110
PCT Pub. Date: Mar. 7, 1996

(30) Foreign Application Priority Data

Sep. 1, 1994 (GB) .................................... 9417600

(51) Int. Cl.
*G01C 21/34* (2006.01)
*G01S 5/00* (2006.01)
*G01S 5/14* (2006.01)
*G08G 1/0962* (2006.01)
*G09B 9/10* (2006.01)
*G08G 1/0967* (2006.01)
*G08G 1/127* (2006.01)
*G08G 1/0968* (2006.01)

(52) U.S. Cl.
USPC ...... 342/357.31; 342/457; 701/431; 701/484; 701/516

(58) Field of Classification Search
None
See application file for complete search history.

(56) References Cited

To view the complete listing of prior art documents cited during the proceeding for Reexamination Control Number 90/012,347, please refer to the USPTO's public Patent Application Information Retrieval (PAIR) system under the Display References tab.

*Primary Examiner* — Simon Ke

(57) ABSTRACT

A navigation information system includes a communications system having a fixed part and at least one mobile part, the fixed part including data storage and a processor identifying the location of a mobile unit, generating guidance information appropriate to that location and transmitting it to the mobile unit. By locating most of the complexity with the service provider, in particular the navigation computer and geographical database, the system can be readily updated and the capital cost of the in-vehicle system, which in its simplest form may be a standard cellular telephone, can be minimized. The user makes a request for guidance information, and the system, having determined the user's present location, then transmits instructions to the user. The user's present location can be determined by a Satellite Positioning System or the like.

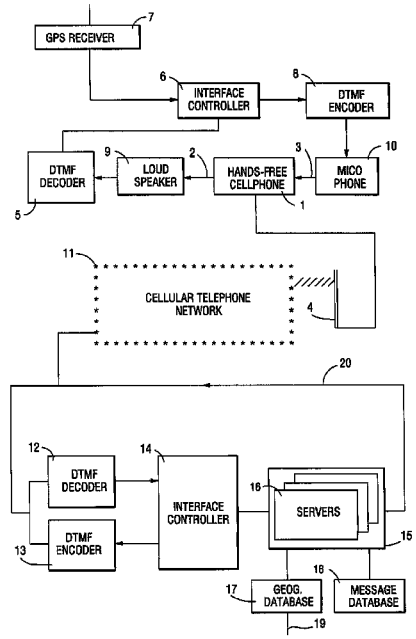

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-51 are cancelled.

\* \* \* \* \*